United States Patent
Masuda et al.

(10) Patent No.: US 10,681,337 B2
(45) Date of Patent: Jun. 9, 2020

(54) METHOD, APPARATUS, AND NON-TRANSITORY COMPUTER-READABLE STORAGE MEDIUM FOR VIEW POINT SELECTION ASSISTANCE IN FREE VIEWPOINT VIDEO GENERATION

(71) Applicant: FUJITSU LIMITED, Kawasaki-shi, Kanagawa (JP)

(72) Inventors: Takuya Masuda, Setagaya (JP); Kazumi Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 15/949,445

(22) Filed: Apr. 10, 2018

(65) Prior Publication Data
US 2018/0302610 A1 Oct. 18, 2018

(30) Foreign Application Priority Data
Apr. 14, 2017 (JP) .................................. 2017-080723

(51) Int. Cl.
*H04N 7/18* (2006.01)
*H04N 13/117* (2018.01)
(Continued)

(52) U.S. Cl.
CPC ......... *H04N 13/282* (2018.05); *A63F 13/213* (2014.09); *G06T 7/70* (2017.01);
(Continued)

(58) Field of Classification Search
CPC .............................. H04N 13/282; G06T 7/70
See application file for complete search history.

(56) References Cited

U.S. PATENT DOCUMENTS

| | | | | | |
|---|---|---|---|---|---|
| 6,380,933 | B1* | 4/2002 | Sharir | .................... | A63F 13/005 345/419 |
| 6,707,487 | B1* | 3/2004 | Aman | ................ | A63B 24/0003 348/169 |

(Continued)

FOREIGN PATENT DOCUMENTS

| EP | 1465115 A2 | 10/2004 |
|---|---|---|
| EP | 2724763 A1 | 4/2014 |

(Continued)

OTHER PUBLICATIONS

Chen, Fan et al., "An Autonomous Framewaork to Produce and Distribute Personalized Team-Sport Video Summaries: A Basketball Case Study", IEEE Transactions on Multimedia, vol. 13, No. 6, Dec. 6, 2011, pp. 1381-1394, XP013372484.

(Continued)

*Primary Examiner* — Irfan Habib
(74) *Attorney, Agent, or Firm* — Fujitsu Patent Center

(57) ABSTRACT

A method for viewpoint selection assistance in free viewpoint video generation includes: executing acquisition processing that includes acquiring three-dimensional information with respect to a subject on a field by using a plurality of cameras placed around the field; executing first identification processing that includes identifying a path of a ball for a predetermined period based on the three-dimensional information; executing second identification processing that includes identifying at least one player located within a predetermined distance from a position of the ball for a predetermined duration of time or longer in the predetermined period; executing setting processing that includes setting, as a video output range, a range containing both of the path of the ball and a path of the at least one player; and executing generation processing that includes generating video for the range set by the setting processing.

6 Claims, 17 Drawing Sheets

(51) Int. Cl.
  *H04N 13/243* (2018.01)
  *H04N 13/282* (2018.01)
  *G06T 7/70* (2017.01)
  *A63F 13/213* (2014.01)

(52) U.S. Cl.
  CPC ............ *H04N 7/181* (2013.01); *H04N 7/188* (2013.01); *H04N 13/117* (2018.05); *H04N 13/243* (2018.05); *G06T 2207/10016* (2013.01); *G06T 2207/30224* (2013.01); *G06T 2207/30228* (2013.01)

(56) References Cited

U.S. PATENT DOCUMENTS

| | | | | |
|---|---|---|---|---|
| 6,710,713 | B1* | 3/2004 | Russo | A63B 24/0021 340/573.1 |
| 6,950,123 | B2* | 9/2005 | Martins | G01S 3/781 348/155 |
| 7,620,466 | B2* | 11/2009 | Neale | G07F 17/3232 700/91 |
| 8,279,051 | B2* | 10/2012 | Khan | A63B 24/0021 340/323 R |
| 8,289,185 | B2* | 10/2012 | Alonso | H04Q 9/00 340/870.11 |
| 8,687,000 | B2* | 4/2014 | Panahpour Tehrani | G06T 15/405 345/419 |
| 8,736,669 | B2* | 5/2014 | Naske | H04N 13/00 348/44 |
| 9,202,526 | B2* | 12/2015 | Hohteri | G11B 27/105 |
| 9,332,218 | B2* | 5/2016 | Smith | G06T 17/00 |
| 2003/0032478 | A1* | 2/2003 | Takahama | A63F 13/04 463/30 |
| 2003/0095186 | A1* | 5/2003 | Aman | A63B 24/0021 348/162 |
| 2007/0135243 | A1* | 6/2007 | LaRue | A63B 24/0021 473/467 |
| 2008/0129825 | A1* | 6/2008 | DeAngelis | A63B 24/0021 348/169 |
| 2008/0140233 | A1* | 6/2008 | Seacat | G06Q 90/00 700/91 |
| 2008/0192116 | A1* | 8/2008 | Tamir | G06T 7/292 348/157 |
| 2009/0046152 | A1* | 2/2009 | Aman | A63B 24/0021 348/157 |
| 2009/0111582 | A1* | 4/2009 | Schuler | A63B 24/0021 463/42 |
| 2010/0030350 | A1* | 2/2010 | House | A63B 24/0021 700/91 |
| 2010/0092155 | A1* | 4/2010 | Inagaki | H04N 5/44513 386/239 |
| 2010/0134614 | A1* | 6/2010 | Aman | A63B 24/0003 348/135 |
| 2011/0071792 | A1* | 3/2011 | Miner | G06K 9/00771 702/182 |
| 2011/0194730 | A1* | 8/2011 | Rhoads | B42D 25/333 382/100 |
| 2011/0304497 | A1* | 12/2011 | Molyneux | A43B 1/0054 342/42 |
| 2012/0057852 | A1* | 3/2012 | Devleeschouwer | G11B 27/034 386/278 |
| 2012/0249831 | A1* | 10/2012 | Porter | H04N 5/23206 348/231.3 |
| 2012/0271440 | A1* | 10/2012 | Lunner | A63B 71/0622 700/91 |
| 2013/0051757 | A1* | 2/2013 | Shahraray | G11B 27/005 386/241 |
| 2013/0321413 | A1* | 12/2013 | Sweeney | H04N 13/257 345/420 |
| 2013/0321575 | A1* | 12/2013 | Kirk | H04N 13/243 13/243 |
| 2014/0125807 | A1* | 5/2014 | Elangovan | G06T 7/20 348/157 |
| 2014/0195914 | A1* | 7/2014 | Gillard | H04N 21/25891 715/719 |
| 2017/0026680 | A1* | 1/2017 | Sugio | H04N 21/262 |
| 2019/0022492 | A1* | 1/2019 | Takahashi | G06F 17/18 |
| 2019/0191146 | A1* | 6/2019 | Koyama | G06T 7/80 |
| 2019/0200041 | A1* | 6/2019 | Kubota | G06T 7/55 |
| 2019/0281274 | A1* | 9/2019 | Sugio | H04N 13/111 |
| 2019/0311526 | A1* | 10/2019 | Sugio | H04N 13/279 |
| 2019/0335154 | A1* | 10/2019 | Tanaka | G06F 3/04815 |
| 2020/0027242 | A1* | 1/2020 | Koyama | G06T 7/80 |
| 2020/0034989 | A1* | 1/2020 | Koyama | G05D 1/0094 |
| 2020/0059675 | A1* | 2/2020 | Yoshikawa | H04N 21/21805 |

FOREIGN PATENT DOCUMENTS

| | | |
|---|---|---|
| JP | 2013-98740 | 5/2013 |
| JP | 2015-187797 | 10/2015 |
| JP | 2016-10145 | 1/2016 |

OTHER PUBLICATIONS

Kasuya, Nozomu et al., "Real-Time Soccer Player Tracking Method by Utilizing Shadow Regions", Proceedings of the ACM Multimedia 2010 International Conference : ACM MM'10 & Co-Located Workshops; Oct. 25, 2010, pp. 1319-1322, XP058390254.

Ohta, Yuichi et al., "Live 3D Video in Soccer Stadium", International Journal of Computer Vision, vol. 75, No. 1, Feb, 14, 2007, pp. 173-187, XP019534972.

European Partial Search Report dated Jul. 27, 2018 for corresponding European Patent Application No. 18166298.2, 15 pages.

Inamoto, Naho et al., "Virtual Viewpoint Replay for a Soccer Match by View Interpolation From Multiple Cameras", IEEE Transactions on Multimedia, vol. 9, No. 6, pp. 1155-1166, Oct. 1, 2017, XP11346455, Cited in EESR dated Oct. 25, 2018 for corresponding European Application No. 18166298.2.

Extended European Search Report dated Oct. 25, 2018 for corresponding European Application No. 18166298.2, 15 pages.

European Office Action dated Sep. 4, 2019 for corresponding European Patent Application No. 18166298.2, 4 pages.

* cited by examiner

FIG. 3

| SCENE tag | START TIME $t_s$ | END TIME $t_e$ |
|---|---|---|
| TEAM A SCORING GOAL | 15:00 | 15:04 |
| ⋮ | ⋮ | ⋮ |

| TIME | BALL COORDINATES | | PLAYER COORDINATES 13b | | | | | | | | | | | | | | | | | | | | | |
|---|---|---|---|---|---|---|---|---|---|---|---|---|---|---|---|---|---|---|---|---|---|---|---|---|
| | P | | $A_0$ | | $A_1$ | | ... | ... | $A_{10}$ | | ... | ... | $B_0$ | | $B_1$ | | ... | ... | $B_{10}$ | |
| t | x | y | x | y | x | y | ... | ... | x | y | ... | ... | x | y | x | y | ... | ... | x | y |
| 15:00 | | | | | | | | | | | | | | | | | | | | |
| 15:01 | | | | | | | | | | | | | | | | | | | | |
| 15:02 | | | | | | | | | | | | | | | | | | | | |
| 15:03 | | | | | | | | | | | | | | | | | | | | |
| 15:04 | | | | | | | | | | | | | | | | | | | | |

METHOD, APPARATUS, AND NON-TRANSITORY COMPUTER-READABLE STORAGE MEDIUM FOR VIEW POINT SELECTION ASSISTANCE IN FREE VIEWPOINT VIDEO GENERATION

CROSS-REFERENCE TO RELATED APPLICATION

This application is based upon and claims the benefit of priority of the prior Japanese Patent Application No. 2017-080723, filed on Apr. 14, 2017, the entire contents of which are incorporated herein by reference.

FIELD

The embodiments discussed herein are related to a method, an apparatus, and a non-transitory computer-readable storage medium for viewpoint selection assistance in free viewpoint video generation.

BACKGROUND

A technique called free viewpoint video is known. In this technique, for example, three-dimensional (3D) information of a subject is analyzed using multiview images captured by a plurality of cameras with different viewpoints. Then, based on the 3D information, free viewpoint video is generated so that video of the subject may be viewed from a free viewpoint, such as a free position or a free direction.

In one aspect, free viewpoint video is utilized in, for example, spectating of various sports such as soccer, basketball, and baseball. For example, free viewpoint video generated for soccer spectating enables players and a ball moving on a plane called a field or pitch to be viewed from a free viewpoint. With presentation of a goal-scoring scene or a scene of a phenomenal play or the like with such free viewpoint video, highly entertaining viewing style may be provided.

Examples of the related art include Japanese Laid-open Patent Publication No. 2013-98740, Japanese Laid-open Patent Publication No. 2015-187797, Japanese Laid-open Patent Publication No. 2016-10145.

SUMMARY

According to an aspect of the invention, a method for viewpoint selection assistance in free viewpoint video generation includes: executing acquisition processing that includes acquiring three-dimensional information with respect to a subject on a field by using a plurality of cameras placed around the field; executing first identification processing that includes identifying a path of a ball for a predetermined period based on the three-dimensional information; executing second identification processing that includes identifying at least one player located within a predetermined distance from a position of the ball for a predetermined duration of time or longer in the predetermined period; executing setting processing that includes setting, as a video output range, a range containing both of the path of the ball and a path of the at least one player; and executing generation processing that includes generating video for the range set by the setting processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of scene information.

FIG. 4 is a diagram illustrating an example of tracking information.

DESCRIPTION OF EMBODIMENTS

In the related art of free viewpoint video generation, however, it is sometimes difficult to select a viewpoint suitable for a given scene due to its high selectability of a viewpoint. In an example where free viewpoint video is generated for soccer spectating, features that viewers and the like are interested in may be the movements of the ball, a player dribbling the ball to score a goal, and a player trying to defend it. It is difficult to select from all viewpoints one that captures all such features in its field of view. In other words, with a conventional technique, a viewer may have to repeat accessing many free viewpoint videos frequently in order to select a viewpoint that captures features in its field of view.

In an aspect of the present disclosure, provided are free viewpoint video generation technologies for assisting in selecting a viewpoint suitable for a given scene.

With reference to the accompanying drawings, the following describes a viewpoint selection assistance program, a viewpoint selection assistance method, and a viewpoint selection assistance apparatus. Note that the following embodiments do not limit the disclosed technique, and that the embodiments may be combined appropriately unless it causes inconsistency in the contents of processing.

Embodiment 1

[System Configuration]

Figure 1:
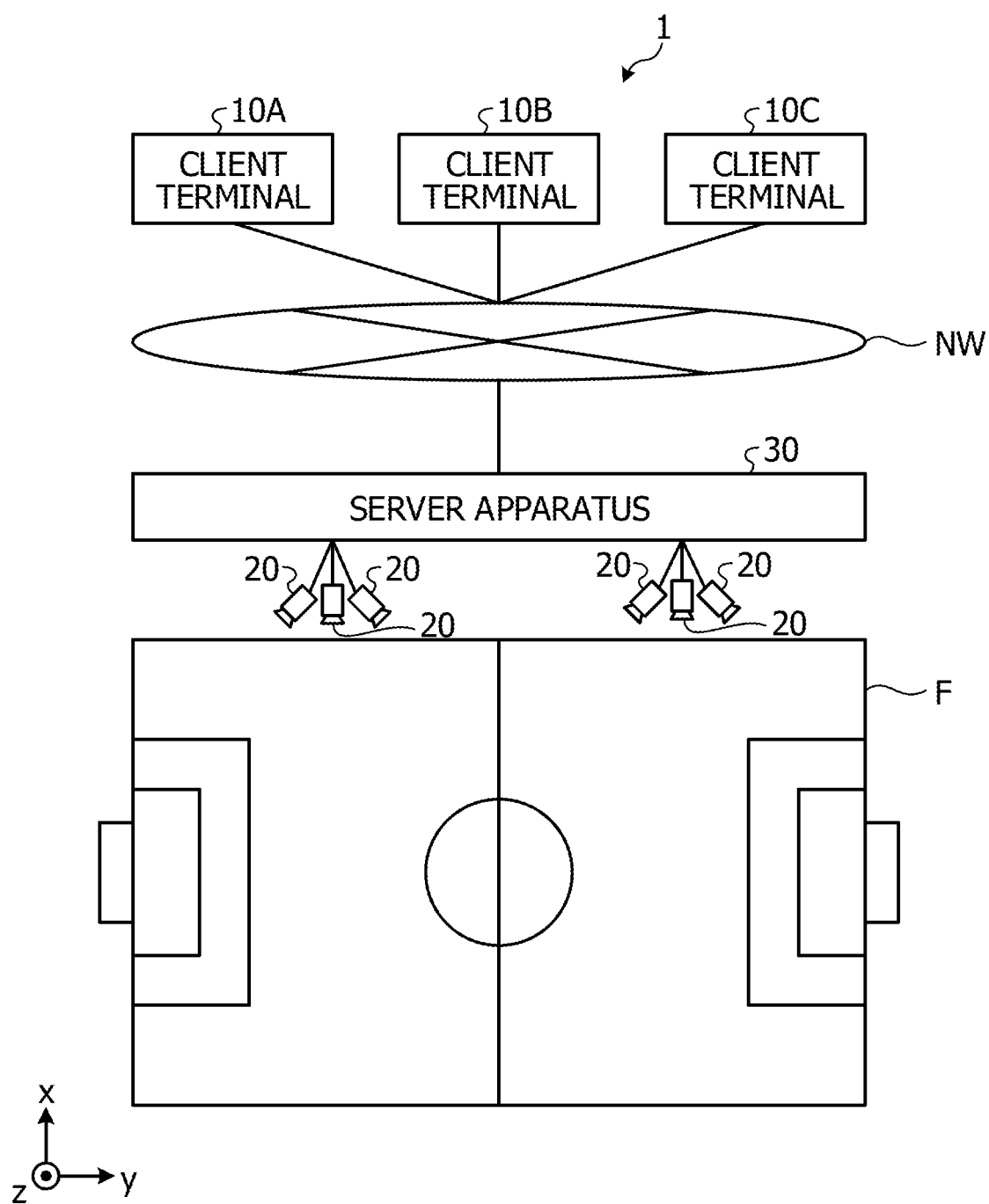
FIG. 1 is a diagram illustrating an example configuration of a video providing system according to Embodiment 1.

FIG. 1 is a diagram illustrating an example configuration of a video providing system according to Embodiment 1. A video providing system 1 illustrated in FIG. 1 provides a video providing service which, in one aspect, provides free viewpoint video generated by combining multiview images captured by a plurality of cameras 20 with different viewpoints.

As illustrated in FIG. 1, the video providing system 1 includes the plurality of cameras 20, a server apparatus 30, and client terminals 10A to 10C. Hereinbelow, each of the client terminals 10A to 10C may be referred to as a "client terminal 10".

The client terminals 10 are connected to the server apparatus 30 via a predetermined network NW. This network NW may be wired or wireless, and constructed with a communication network of any type, such as the Internet, a local area network (LAN), or a virtual private network (VPN).

Although the video providing system 1 illustrated in FIG. 1 provides free viewpoint video via the network NW as an example, this merely is an example video providing mode, and the communications between each client terminal 10 and the server apparatus 30 do not have to be bidirectional. For instance, free viewpoint video may be provided from the server apparatus 30 to the client terminal 10 not through the network NW, but through airwaves.

The cameras 20 are each an imaging device equipped with an image sensor such as a charge-coupled device (CCD) sensor or a complementary metal-oxide-semiconductor (CMOS) sensor.

FIG. 1 depicts an example of the arrangement of the cameras 20 in soccer spectating. For instance, the real space on a soccer field F is generated as free viewpoint video for soccer spectating. In this case, the plurality of cameras 20 are placed around the field F, facing toward the inside of the field F. The cameras 20 are so placed that the entire area of the field F is captured within the combined image capturing fields of the respective cameras 20. In order to enable analysis of the 3D structure of a subject on the field F based on pixels common between images captured by two or more cameras 20, each camera 20 is placed so that its image capturing range may overlap that of another one or more cameras 20. When the cameras 20 thus arranged capture images in synchronization with one another on a frame-by-frame basis, a plurality of images captured simultaneously from different viewpoints, or multiview images, are obtained per frame. Note that the field F is an example of a plane.

The server apparatus 30 is a computer that provides the above-described video providing service.

In one embodiment, the server apparatus 30 may be implemented when a video providing program for implementing the video providing service is installed in a desired computer as packaged software or online software. For example, the server apparatus 30 may be implemented as a web server providing the video providing service, or as a cloud providing the above-described video providing service as an outsourced service.

For example, the server apparatus 30 analyzes 3D information on a subject based on multiview images captured by the cameras 20. This enables generation of free viewpoint video for soccer spectating. Then, the server apparatus 30 provides the client terminal 10 with information used for generation of free viewpoint video, such as the 3D information and a time series of the multiview images. Hereinbelow, the information used for generation of free viewpoint video may be referred to as "video generation information". For example, the server apparatus 30 may provide the video generation information for the entire soccer game from the start to the end of the game, or only for a particular scene from the game, such as a goal-scoring scene or a scene of a phenomenal play. In addition to providing such free viewpoint video for a game or a scene from a game, the server apparatus 30 may also provide the client terminal 10 with tracking information, in which the movements of a ball, players, and referees are tracked using the 3D information.

The client terminal 10 is a computer that receives the above-described video providing service.

In one embodiment, the client terminal 10 is any computer used by a viewer receiving the above-described video providing service. For example, the client terminal 10 may be a fixed terminal such as a desktop or laptop personal computer, a mobile phone such as a smartphone, a mobile communication terminal such as a personal handy-phone system (PHS) or a personal digital assistant (PDA), or a tablet terminal.

Implemented in the client terminal 10 according to the present embodiment is a user interface (UI) equipped with a viewpoint selection assistance function which assists in selecting a scene-suited viewpoint.

To be more specific, due to its high selectability of viewpoint, free viewpoint video has an aspect of being difficult to select a scene-suited viewpoint. In an example where free viewpoint video is generated for soccer spectating, features that viewers and the like are interested in may be the ball, a player dribbling the ball to score, and a player trying to defend it. It is however difficult to select from all viewpoints one that captures all such features in its field of view.

The client terminal 10 according to the present embodiment narrows the players down to ones involved with the ball based on the moving path of the ball specified by reference to the tracking information on a given scene, and sets an area of interest to an area containing the movement paths of the ball and the players thus narrowed down to. Provision of such an area of interest as viewpoint selection assistance information helps select, from free viewpoints, a viewpoint whose field of view captures the features of interest in sport spectating. Thus, the client terminal 10 according to the present embodiment helps assist in selecting a scene-suited viewpoint.

[Functional Configuration of the Client Terminal 10]

Figure 2:
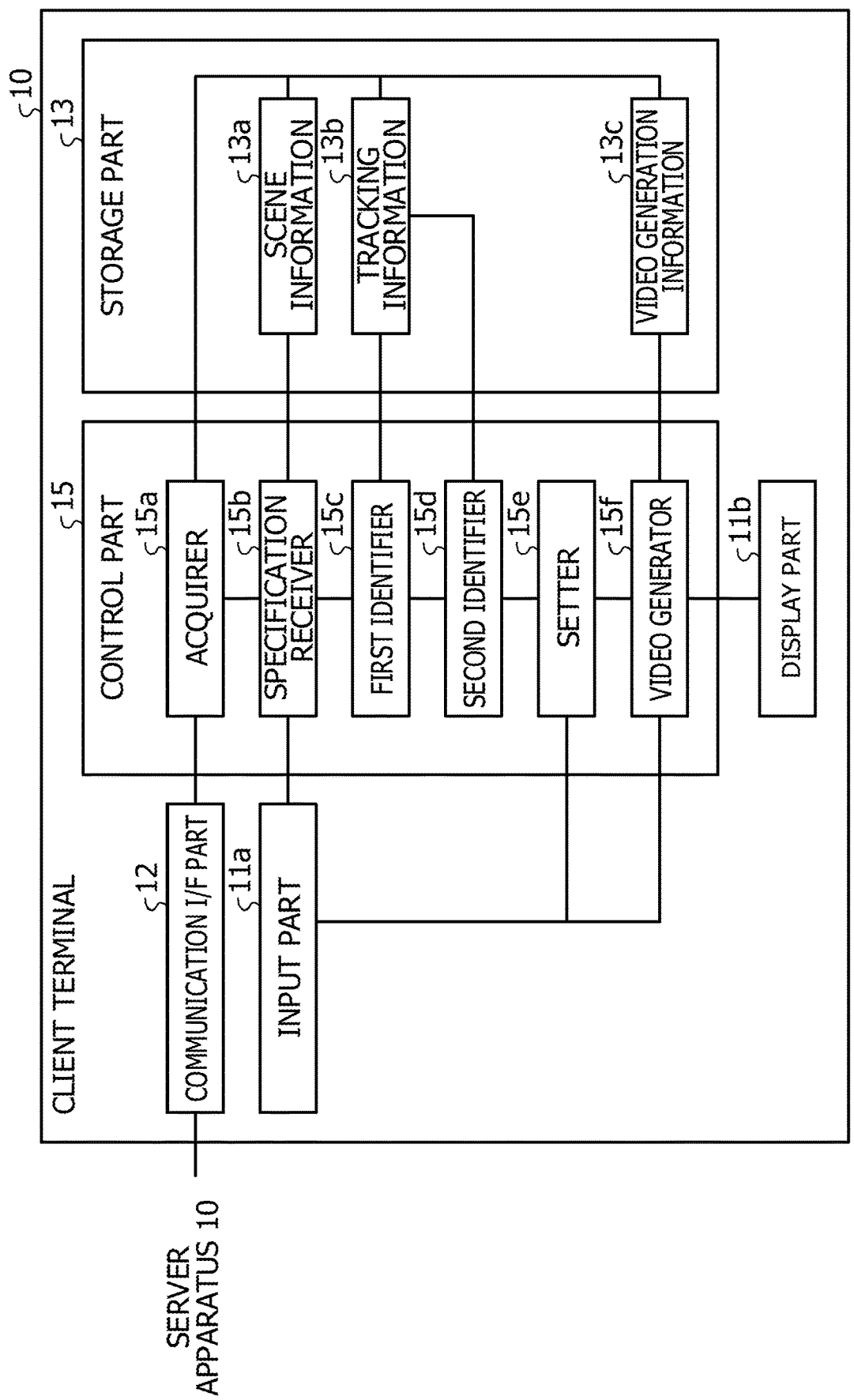
FIG. 2 is a block diagram illustrating a functional configuration of a client terminal according to Embodiment 1.

FIG. 2 is a block diagram illustrating the functional configuration of the client terminal 10 according to Embodiment 1. FIG. 2 depicts data input and output relations with solid lines, but for convenience reasons, only for a minimum part. The data inputs and outputs by each functional part are not limited to what is depicted in FIG. 2, and data may be inputted or outputted in a manner not depicted in FIG. 2. For example, data may be inputted or outputted between a functional part and another functional part, between a functional part and data, as well as between a functional part and an external device.

In addition, FIG. 2 depicts only functional parts that are relevant to the viewpoint selection assistance function described above, and the client terminal 10 may include other functional parts which are not depicted in FIG. 2 but which an existing computer may have. For example, when a mobile terminal device is used as the client terminal 10, the client terminal 10 may include functional parts corresponding to hardware pieces such as sensors including an antenna and a motion sensor, a loudspeaker, and a camera. Some of these general-purpose functional parts in an existing computer may not be illustrated in FIG. 2. Functional parts useful in implementing the above-described viewpoint selection assistance function may be included in the client terminal 10 even if they are omitted from FIG. 2.

As illustrated in FIG. 2, the client terminal 10 has an input part 11a, a display part 11b, a communication I/F part 12, a storage part 13, and a control part 15.

The input part 11a is a functional part that receives various instructional inputs.

For example, when a desktop or laptop computer is used as the client terminal 10, general-purpose peripherals such as a key board and a mouse correspond to the input part 11a, and also, the input part 11a includes a joystick that pivots to the top, bottom, left, and right.

The display part 11b is a functional part that display various kinds of information.

For example, the display part 11b is a crystal-liquid display or an organic electroluminescence display that displays images by emitting light. The display part 11b may be, besides such a device that displays images by light emission, a projector that displays images by projection.

The input part 11a and the display part 11b do not have to be implemented as separate functional parts. For example, when a mobile terminal device or a tablet terminal is used as the client terminal 10, or when basic software such as an operating system running on the client terminal 10 supports a touch panel I/O, the input part 11a and the display part 11b are a device such as a touch panel having both input and display functions.

The communication I/F part 12 is an interface that controls communications with another device, such as the server apparatus 30.

In one embodiment, the communication I/F part 12 is a network interface such as a LAN card. For example, the communication I/F part 12 receives, from the server apparatus 30, a list of scenes that the server apparatus 30 provides to the client terminal 10, as well as free viewpoint video and tracking information for a scene specified by the client terminal 10. The communication I/F part 12 also sends the server apparatus 30 specification of a scene the free viewpoint video for which is requested by the client terminal 10.

The storage part 13 is a storage device that stores data used for various programs including the operating system (OS) executed by the control part 15 and the viewpoint selection assistance program for implementing the viewpoint selection assistance function described above.

In one embodiment, the storage part 13 is implemented as an auxiliary storage device of the client terminal 10. For example, the auxiliary storage device includes a hard disk drive (HDD), an optical disk, and a solid-state drive (SSD). When a smartphone or a tablet terminal is used as the client terminal 10, the auxiliary storage device is flash memory such as an erasable programmable read-only memory (EPROM).

As examples of data used for programs executed by the control part 15, the storage part 13 stores scene information 13a, tracking information 13b, and video generation information 13c. The storage part 13 may store other electronic data besides the scene information 13a, the tracking information 13b, and the video generation information 13c. For example, the storage part 13 may also store information such as an account for using the video providing service and a viewing history of free viewpoint video. Descriptions of the scene information 13a, the tracking information 13b, and the video generation information 13c will be given later along with descriptions for how each of these pieces of information is stored in the storage part 13 by functional parts in the control part 15.

The control part 15 is a processor that performs overall control of the client terminal 10.

In one embodiment, the control part 15 may be implemented by a hardware processor such as a central processing unit (CPU) or a microprocessing unit (MPU). Although a CPU and an MPU are given here as examples of a processor, the control part 15 may be implemented by any general-purpose or specific-purpose processor. Alternatively, the control part 15 may be implemented by hard wired logic such as an application-specific integrated circuit (ASIC) or a field programmable gate array (FPGA).

The control part 15 virtually implements the processors described below by loading a viewpoint selection assistance program for implementing the viewpoint selection assistance function into a work area in a RAM such as a dynamic random-access memory (DRAM) or a static random-access memory (SRAM).

As illustrated in FIG. 2, the control part 15 has an acquirer 15a, a specification receiver 15b, a first identifier 15c, a second identifier 15d, a setter 15e, and a video generator 15f.

The acquirer 15a is a processor that acquires various pieces of information from the server apparatus 30.

In one aspect, the acquirer 15a downloads from the server apparatus 30 the scene information 13a defining scenes in soccer-game spectating to prompt a viewer (a user) to specify a scene to view on the browser of the client terminal 10. The scene information 13a thus downloaded is stored in the storage part 13.

For example, in the scene information 13a, each scene is defined by items such as a scene tag, a start time ts, and an end time te. The "scene tag" here indicates a tag that identifies a scene. The "start time" indicates the time when the scene identified by the scene tag starts. The "end time" indicates the time when the scene identified by the scene tag ends. Any time representation may be used for the "start time" and the "end time". For example, if the time is represented according to the elapse time of the soccer game, the time in the first half of the game may be represented based on the time elapsed from the start of the first half of the game, and the time in the second half of the game may be represented based on the time elapsed from the start of the second half of the game. As another possible time representation, if the match time is 90 minutes, the start of the first half of the game may be set to the 0th minute, and the start of the second half of the game is set to the 45th minute. These time representations using the elapse time are mere examples. The time may also be represented according to calendar time.

FIG. 3 is a diagram illustrating an example of the scene information 13a. FIG. 3 illustrates only a record for one scene for convenience reasons, but this is merely an example, and the provider of the video providing service may of course determine any population of scenes for which a viewing request may be issued. The record in the scene information 13a illustrated in FIG. 3 as an example indicates that Team A's goal-scoring scene is from the 15th minute and the 00th second (15:00) to the 15th minute and the 04th second (15:04) from the start of the game. For example, such scene information 13a may be defined not only by the provider of the video providing service in any selected way, but also by the viewer.

Although the example in FIG. 3 illustrates a case where a scene is defined by the scene tag, the start time ts, and the end time te, any other items may also be included. As an example of such an item, the scene information 13a may also include game identification information for identifying a soccer game. In this case, for example, scenes from the same game may be extracted from the scenes included in the scene information 13a. Further, if the scene information 13a also includes the date of a soccer game as an item, for example, scenes of games held on the same date may be extracted from the scenes included in the scene information 13a. For example, if the scene information 13a also includes, as an item, identification information on an opposing team, scenes from the games played by a given team may be extracted from the scenes included in the scene information 13a.

In another aspect, upon receipt of specification of a scene from the specification receiver 15b to be described later, the acquirer 15a downloads from the server apparatus 30 the tracking information 13b and the video generation information 13c for the period of the scene in the game. The tracking information 13b and the video generation information 13c thus downloaded are stored in the storage part 13.

Among the tracking information 13b and the video generation information 13c, the tracking information 13b is a time series of the positions of the ball and players. For example, the tracking information 13b includes items such as a time, ball coordinates, and player coordinates. The "time" here is, in one example, the time elapsed in a soccer game. The "ball coordinates" are the coordinates of a ball on the field F, tracked from a time series of 3D information on the subject on the field F. The "player coordinates" are the coordinates of each player on the field F, tracked from a time series of 3D information on the subject on the field F. The "players" here may include ones from both teams or from one team.

FIG. 4 is a diagram illustrating an example of the tracking information 13b. FIG. 4 depicts the tracking information 13b on a ball and players for a scene "Team A Scoring Goal" which is from a game between Team A and Team B and identified by the scene tag illustrated in FIG. 3. As illustrated in FIG. 4, the tracking information 13b includes a time series of ball coordinates, time series of the coordinates of eleven players on Team A, time series of the coordinates of eleven players on Team B. As the time series of the ball and player coordinates, tracking results from the start time "15:00" to the end time "15:04" of the scene are acquired at intervals of, for example, seconds. The coordinates of the ball and players are represented in the two-dimensional Cartesian coordinate system with the X axis and the Y axis being along the plane of the field F. Hereinbelow, a time series of coordinates may be referred to as a path.

The video generation information 13c is used for generation of free viewpoint video for the scene specified via the specification receiver 15b. The video generation information 13c includes, for example, 3D information and a time series of multiview images of a subject on the field F. For example, when the scene tag "Team A Scoring Goal" included in the scene information 13a illustrated in FIG. 3 is specified, time series for a period from the start time "15:00" to the end time "15:04" of the scene are acquired. Based on the video generation information 13c thus acquired, free viewpoint video is generated for the position of the viewpoint selected by the viewer via the input part 11a.

Referring back to FIG. 2, the specification receiver 15b is a processor that receives specification of a scene.

In one embodiment, the specification receiver 15b displays on the display part 11b a scene-list screen containing a list of scenes included in the scene information 13a stored in the storage part 13, and receives specification of a scene made on the scene list screen via the input part 11a. For example, such a list of scenes may include scenes from games held on the same date or scenes from games played by a team selected through the input part 11a or the like.

The first identifier 15c is a processor that identifies the path of a ball for a predetermined period of time.

Figure 5:
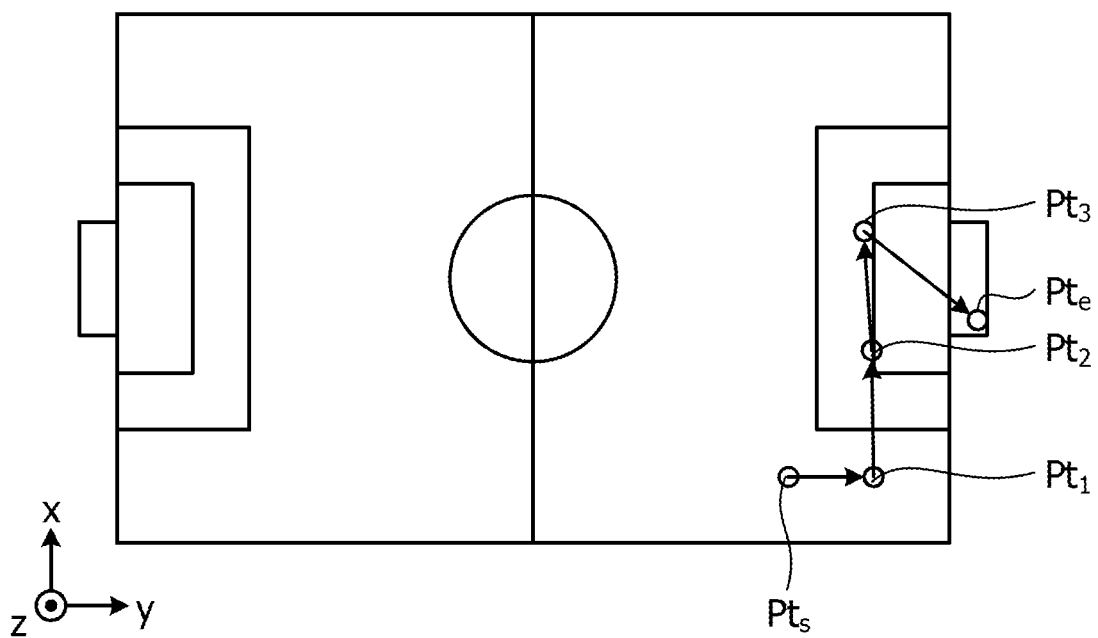
FIG. 5 is a diagram illustrating an example of the path of a ball.

In one embodiment, when the specification receiver 15b receives specification of a scene, the first identifier 15c identifies, in the tracking information 13b acquired by the acquirer 15a, a time series of ball coordinates (or the path of the ball) for a period corresponding to the specified scene. FIG. 5 is a diagram illustrating an example of the path of a ball. In FIG. 5, a time series of ball coordinates from the tracking information 13b in FIG. 4 is plotted on the field F. In other words, coordinates Pts of a ball 15 minutes and 00 second after the start of the game, coordinates Pt1 of the ball 15 minutes and 01 second after the start of the game, coordinates Pt2 of the ball 15 minutes and 02 seconds after the start of the game, coordinates Pt3 of the ball 15 minutes and 03 seconds after the start of the game, and coordinates Pte of the ball 15 minutes and 04 seconds after the start of the game are plotted with black circular marks. It is seen in FIG. 5 that, in the scene "Team A Scoring Goal", the ball moves along a path which offensively progresses on the right side of Team A, is thrown to the center near the right goalpost of Team B, and then is sent into the goal.

The second identifier 15d is a processor that identifies one or more players who are within a predetermined distance from the position of the ball for a predetermined duration of time or longer in a predetermined period of time.

In one embodiment, from the path of the ball identified by the first identifier 15c, the second identifier 15d extracts a point of change where the direction or the speed of the ball changes to a large extent. For example, for each pair of ball coordinate sets which are on the path of the ball and are adjacent to each other in the tracking time, the second identifier 15d calculates the direction and speed of the ball moving between the sets of the ball coordinates. The moving direction of the ball may be obtained by, for example, calculating an angular displacement from any reference direction on the XY plane. The speed of the ball may be obtained by dividing the distance between the two sets of ball coordinates by the time intervals of tracking the two sets of ball coordinates.

Then, the second identifier 15d determines whether an amount of change between the moving direction of the ball calculated for the N-th pair of ball coordinate sets (where N is a natural number) and the moving direction of the ball calculated for the (N−1)-th pair of ball coordinate sets is larger than or equal to a predetermined threshold or not. If the amount of change in the moving direction of the ball is smaller than the predetermined threshold, the second identifier 15d further determines whether an amount of change between the moving speed of the ball calculated for the N-th pair of ball coordinate sets and the moving speed of the ball calculated for the (N−1)-th pair of ball coordinate sets is larger than or equal to a predetermined threshold or not.

If the amount of change in the moving direction of the ball is larger than or equal to the threshold, or if the amount of change in the moving speed of the ball is larger than or equal to the threshold, it may be determined that an external force such as trapping, passing, or shooting acts on the ball at the ball coordinates common between the N-th pair of ball coordinate sets and the (N−1)-th pair of ball coordinate sets. Then, the second identifier 15d extracts, as a point of change, the ball coordinates common between the N-th pair of ball coordinate sets and the (N−1)-th pair of ball coordinate sets.

After a point of change is extracted from the path of the ball, the second identifier 15d identifies, for each point of change, a player or players who are within a predetermined distance from the point of change. For instance, the second identifier 15d identifies, among the player coordinates included in the tracking information 13b, a player or players with coordinates which are tracked at the same time as the point of change and are within a predetermined distance, for example three meters, from the coordinates of the point of change. Then, the second identifier 15d identifies, among the paths of players included in the tracking information 13b, paths of the player(s) who are thus identified for each point of change.

Figure 6:
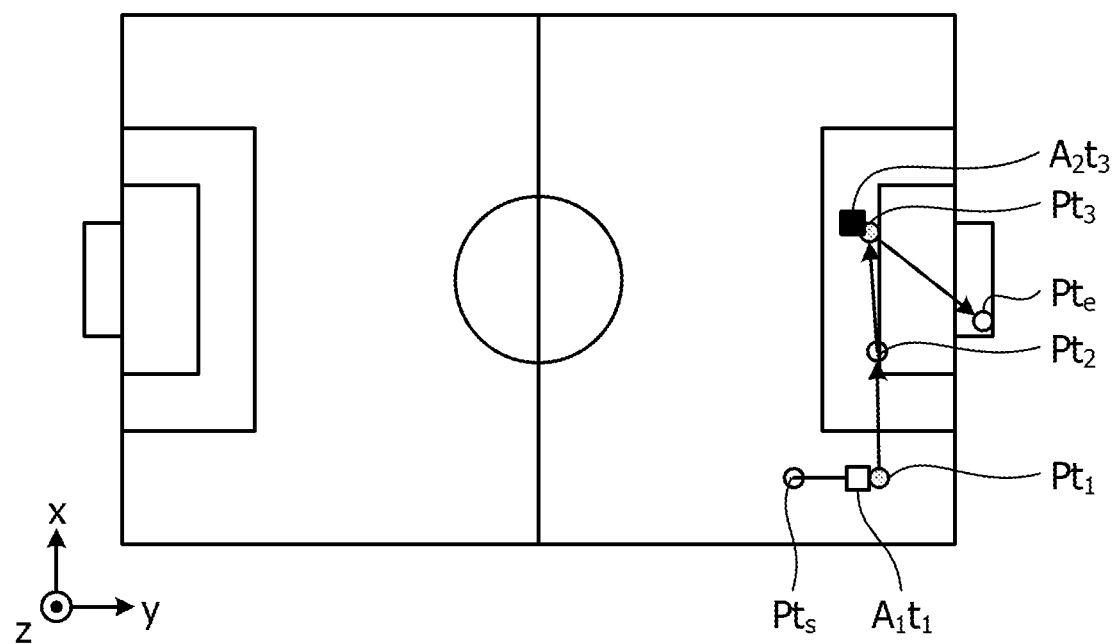
FIG. 6 is a diagram illustrating an example of a method of player identification.

FIG. 6 is a diagram illustrating an example of a method of player identification. In FIG. 6, as in FIG. 5, a time series of ball coordinates is plotted on the field F with circular marks. For the plotting of these marks, one corresponding to the ball coordinates of a point of change is shaded with dots, whereas one corresponding to the ball coordinates which are not a point of change is filled in black. As depicted in FIG. 6, among the coordinates Pts, Pt1, Pt2, Pt3, and Pte of the ball 15 minutes and 00 second, 01 second, 02 seconds, 03 seconds, and 04 seconds, respectively, after the start of the game, the ball coordinates Pt1 where the ball is centered and the ball coordinates Pte where the ball is shot are extracted by the second identifier 15d as points of change. Then based on the ball coordinates Pt1 and the ball coordinates Pt3, the second identifier 15d identifies a player A1 of coordinates A1t1 located within the predetermined distance from the ball coordinates Pt1 and a player A2 of coordinates A2t3 located within the predetermined distance from the ball coordinates Pt3.

Figure 7:
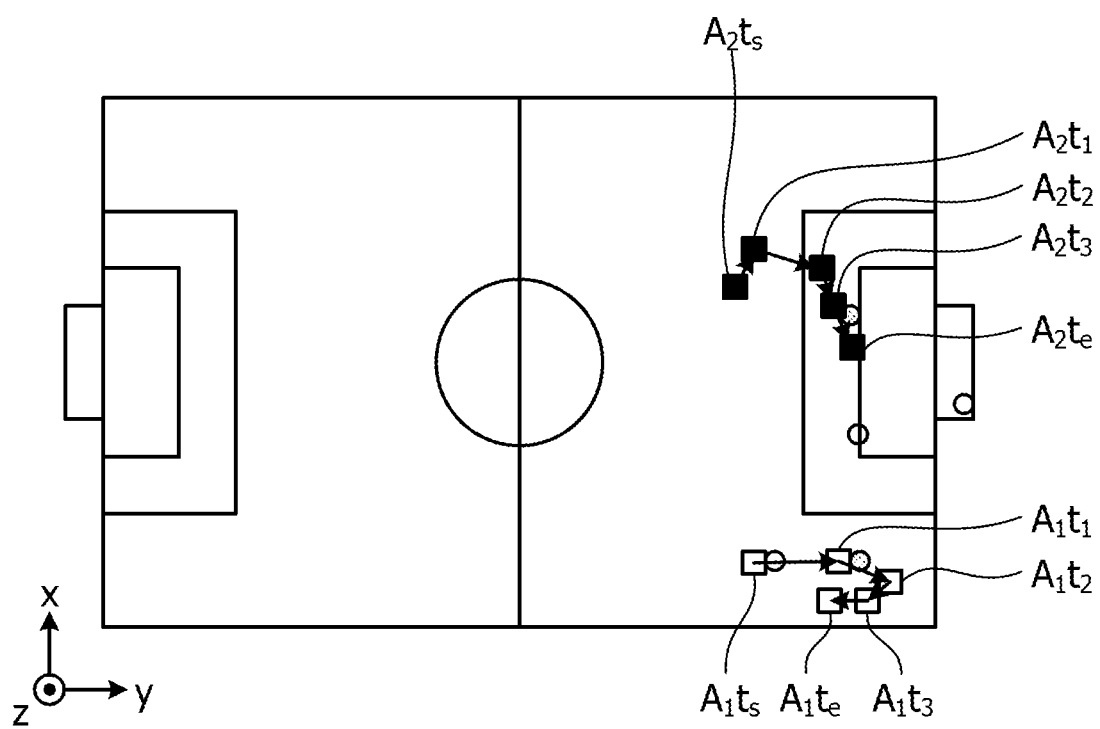
FIG. 7 is a diagram illustrating an example of the paths of players.

After identifying the players, as depicted in FIG. 7 the second identifier 15d identifies the paths of the players identified for the respective points of change, among the paths of players included in the tracking information 13b. FIG. 7 is a diagram illustrating an example of paths of the players. As the path of the player A1 located within the predetermined distance from the point of change Pt1, the second identifier 15d identifies, as plotted in FIG. 7 with white square marks, the coordinates A1ts of the player A1 15 minutes and 00 second after the start of the game, the coordinates A1t1 of the player A1 15 minutes and 01 second after the start of the game, the coordinates A1t2 of the player A1 15 minutes and 02 seconds after the start of the game, the coordinates A1t3 of the player A1 15 minutes and 03 seconds after the start of the game, and the coordinates A1te of the player A1 15 minutes and 04 seconds after the start of the game. In addition, as the path of the player A2 located within the predetermined distance from the point of change Pt3, the second identifier 15d identifies, as plotted in FIG. 7 with black square marks, the coordinates A2ts of the player A2 15 minutes and 00 second after the start of the game, the coordinates A2t1 of the player A2 15 minutes and 01 second after the start of the game, the coordinates A2t2 of the player A2 15 minutes and 02 seconds after the start of the game, the coordinates A2t3 of the player A2 15 minutes and 03 seconds after the start of the game, and the coordinates A2te of the player A2 15 minutes and 04 seconds after the start of the game.

The setter 15e is a processor that sets, as a video output range, a range that contains the path of the ball on the plane and the path of at least one player on the plane.

Figure 8:
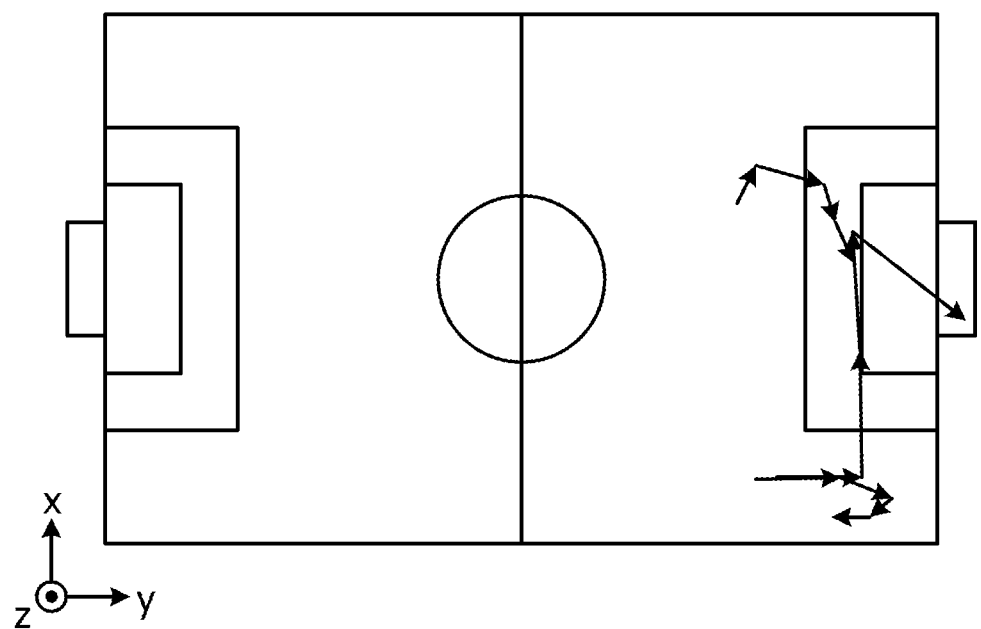
FIG. 8 is a diagram illustrating an example of the paths of the ball and players.
Figure 9:
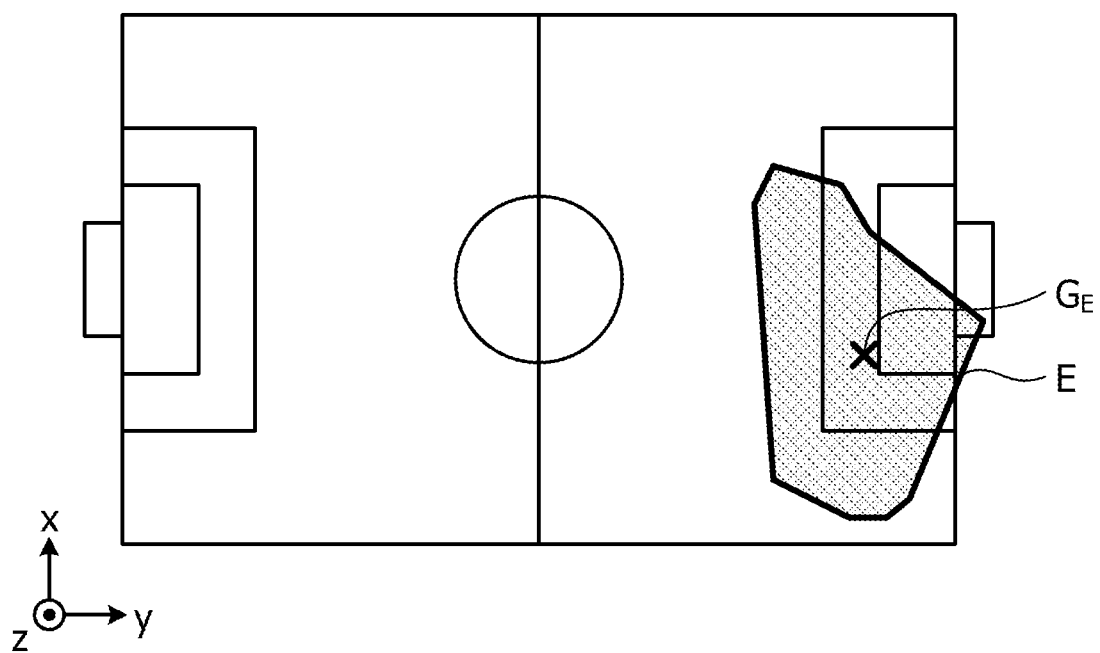
FIG. 9 is a diagram illustrating an example of a video output range.

In one aspect, the setter 15e sets, as a video output range, a range that contains the path of the ball on the field F identified by the first identifier 15c and the path(s) of the player(s) on the field F identified by the second identifier 15d. FIG. 8 is a diagram illustrating an example of the paths of the ball and players. In FIG. 8, the path of the ball on the field F depicted in FIG. 5 and the paths of the players A1 and A2 depicted in FIG. 7 are plotted. FIG. 9 illustrates a figure that contains the paths of the ball and players A1 and A2 on the field F depicted in FIG. 8. FIG. 9 is a diagram illustrating an example of a video output range. The setter 15e sets a range E on the field F depicted in FIG. 9 as a video output range. This video output range likely contains the movements of the ball, a player dribbling the ball to score a goal, and a player defending it, and is therefore likely an area of interest which draws attention as a feature in soccer spectating.

Figure 10:
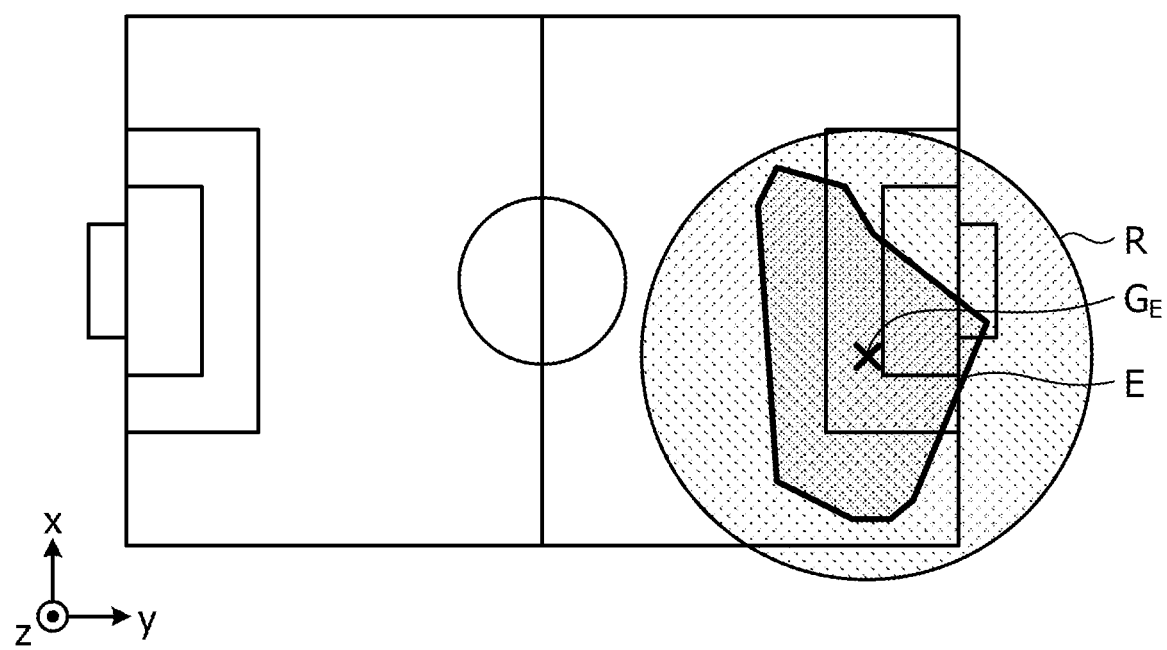
FIG. 10 is a diagram illustrating an example of a spherical plane R.
Figure 11:
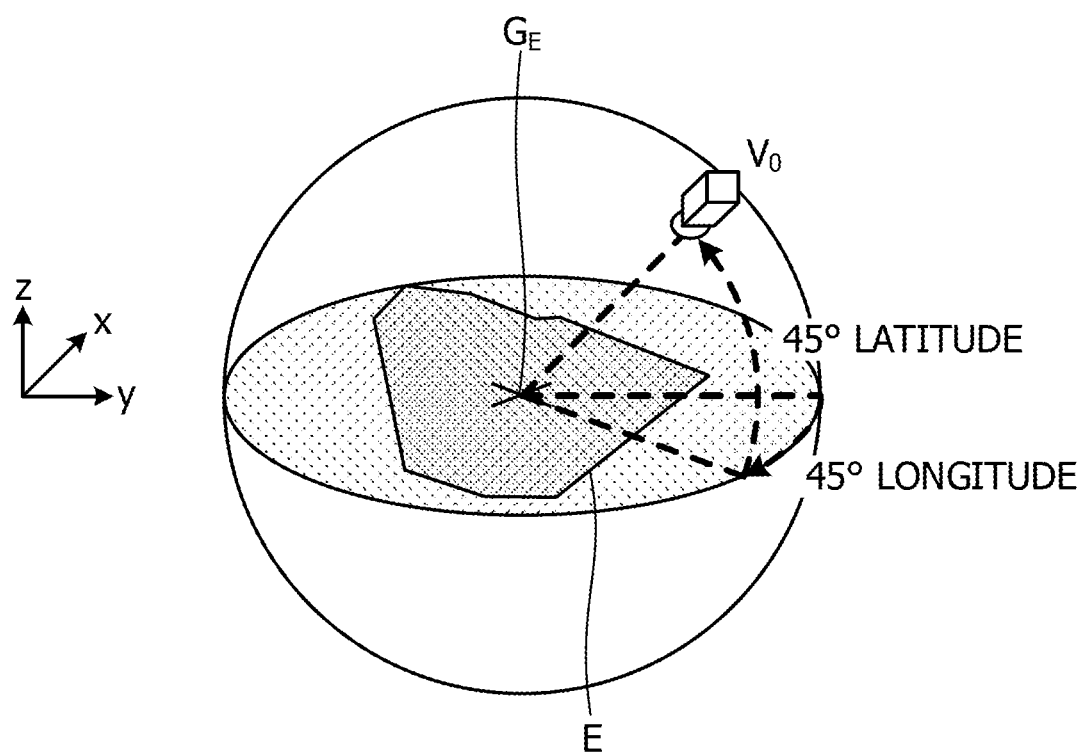
FIG. 11 is a diagram illustrating an example of a preset viewpoint.
Figure 12:
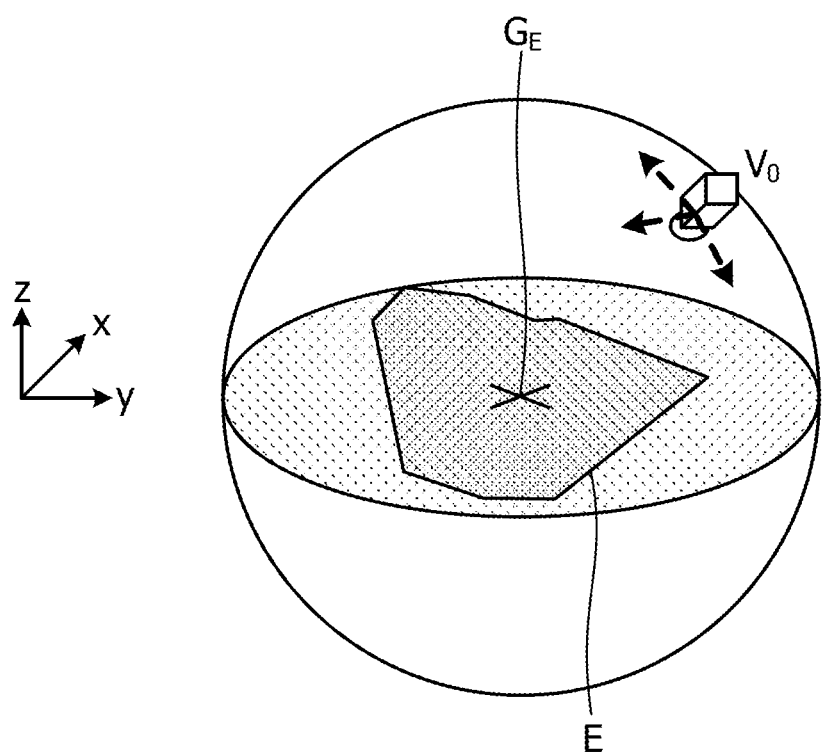
FIG. 12 is a diagram illustrating an example of a method of receiving a change in position of a viewpoint.

Further, the setter 15e sets a minimum spherical plane containing the video output range and having the center of mass of the video output range as its center. Although a minimum spherical plane is set in the example given herein, this is merely an example, and a spherical plane which is larger than the minimum spherical plane by having a predetermined additional width (for example α (=5 m)) to the radius of the minimum spherical plane may be set instead. For example, a spherical plane R that contains the video output range E depicted in FIG. 9 and has the center of mass GE of the video output range E as its center is set as illustrated in FIG. 10. FIG. 10 is a diagram illustrating an example of the spherical plane R. As depicted in FIG. 10, the setter 15e may receive positioning of the viewpoint on the spherical plane R via the input part 11a such as a joystick. Also, as illustrated in FIG. 11, the initial position of the viewpoint may be preset. FIG. 11 is a diagram illustrating an example of a preset viewpoint. FIG. 11 depicts the coordinate system of the spherical plane R having zero longitude along the progressing direction of the attacking Team A and zero latitude along the plane of the field F. As illustrated in FIG. 11, a viewpoint's initial position V0 may be preset to a position on the spherical plane R at 45° latitude and 45° longitude. Further, the direction of the viewpoint may be preset to a direction pointing from the viewpoint's initial position V0 to the center of mass GE of the video output range E. FIG. 12 is a diagram illustrating an example of a method of receiving a change in position the viewpoint. After the viewpoint is preset to the initial position V0 as illustrated in FIG. 11, the setter 15e allows the viewpoint to be moved on the spherical plane R as illustrated in FIG. 12 when receiving a change in (or selection of) the position of the viewpoint via the input part 11a. Not only the selection of the viewpoint, but also actions such as changing the direction of the viewpoint, zooming-in, or zooming out may of course be done via the input part 11a.

The video generator 15f is a processor that generates free viewpoint video. For example, the video generator 15f generates a free viewpoint image by generating a 3D model based on the 3D information in the video generation information 13c, performing texture mapping on the 3D model with multiview images based on the position of the viewpoint selected via the input part 11a, and rendering the texture mapped 3D model. Free viewpoint video is reproduced when free viewpoint images thus generated are displayed on the display part 11b one after another.

In one embodiment, when the viewpoint is preset to the initial position V0, the video generator 15f uses the video generation information 13c stored in the storage part 13 to generate, as a preview, a free viewpoint image at the start time of the scene from the initial position V0 and direction of the viewpoint. When instructed to reproduce free viewpoint video via the input part 11a, the video generator 15f generates a free viewpoint image for a new frame every time a certain period of time elapses from the start time of the scene. If the viewpoint is moved on the spherical plane, the video generator 15f generates a free viewpoint image that corresponds to the moved viewpoint. If the viewpoint is not moved, the video generator 15f generates a free viewpoint image that corresponds to the viewpoint being selected. Such reproduction of the free viewpoint video is repeated till the end of the scene.

[Processing Procedure]

Figure 13:
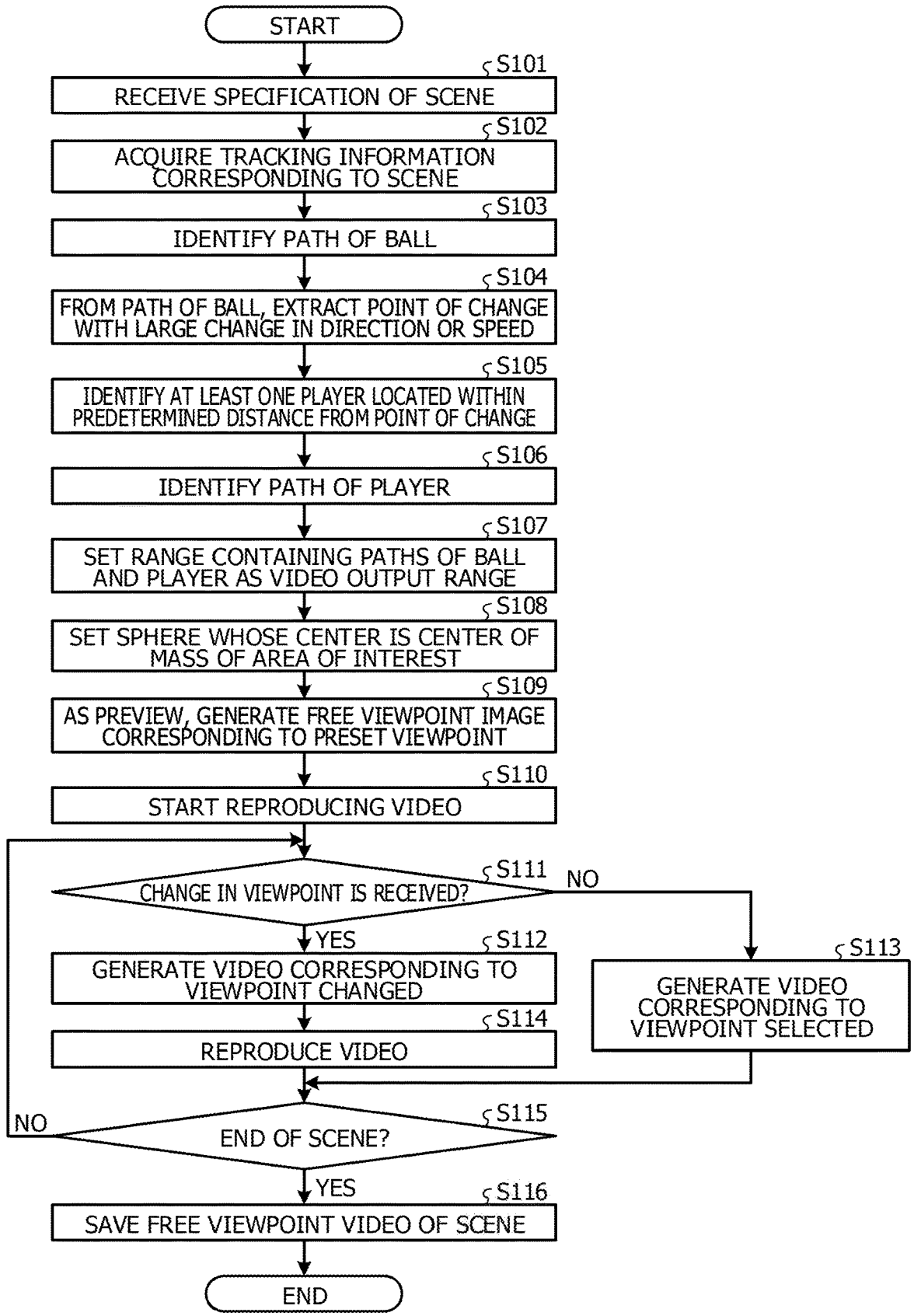
FIG. 13 is a flowchart illustrating a procedure of video reproduction processing according to Embodiment 1.

FIG. 13 is a flowchart illustrating the procedure of video reproduction processing according to Embodiment 1. This processing is started when, for example, specification of a scene is received. As illustrated in FIG. 13, when the specification receiver 15b receives specification of a scene (Step S101), the acquirer 15a acquires, from the server apparatus 30, the tracking information 13b and the video generation information 13c corresponding to the period of the scene in the game (Step S102).

Next, the first identifier 15c identifies, in the tracking information 13b acquired in Step S102, a time series of ball coordinates corresponding to the period of the specified scene as the path of the ball in that period (Step S103).

Then, from the path of the ball identified in Step S103, the second identifier 15d extracts a point of change where the moving direction or speed of the ball changes to a large extent (Step S104). The second identifier 15d then identifies, among the coordinates of players included in the tracking information 13b, a player with the coordinates which are tracked at the same time that the point of change is tracked and are located within a predetermined distance from the coordinates of the point of change (Step S105).

Next, the second identifier 15d identifies, among the paths included in the tracking information 13b, the path of the player identified in Step S105 (Step S106).

After that, the setter 15e sets, as a video output range, a range that contains both the path of the ball on the field F identified in Step S103 and the path of the player on the field F identified in Step S106 (Step S107). The setter 15e then presets the initial position of a viewpoint on a spherical plane which contains the video output range set in Step S107 and has the center of mass of the video output range as its center (Step S108).

Then, using the video generation information 13c stored in the storage part 13, the video generator 15f generates, as a preview, a free viewpoint image for the start time of the scene seen from the viewpoint set to the initial position V0 and direction (Step S109).

Then, when instructed to reproduce free viewpoint video via the input part 11a (Step S110), the video generator 15f determines at the timing of generation of a free viewpoint image for a new frame whether a change in the viewpoint on the spherical plane R is made via the input part 11a (Step S111).

If the viewpoint on the spherical plane R is changed (Yes in Step S111), the video generator 15f generates a free viewpoint image corresponding to the viewpoint after the change (Step S112). If no change is made on the viewpoint (No in Step S111), the video generator 15f generates a free viewpoint image corresponding to the viewpoint being selected (Step S113). The free viewpoint image thus generated in Step S112 or S113 is displayed on the display part 11b (Step S114).

Thereafter, until the scene ends (No in Step S115), Steps S111 to S114 are repeated. After the scene ends (Yes in Step S115), the video generator 15f stores the series of the free viewpoint images displayed in Step S114 as free viewpoint video (Step S116), and the processing ends.

[One Aspect of Advantageous Effects]

As described above, the client terminal 10 according to the present embodiment narrows the players to one or ones that are involved with the ball based on the moving path of the ball identified by reference to tracking information on a specified scene, and sets, as an area of interest, an area containing the moving paths of the ball and the player(s) thus narrowed down to. By providing such an area of interest as viewpoint selection assistance information, the client terminal 10 may assist in selecting one of free viewpoints that captures within its field of view a feature that draws viewers' interest in sports spectating. Thus, the client terminal 10 of the present embodiment may assist in selecting a scene-suited viewpoint.

Embodiment 2

Although the disclosed apparatus has been described using the embodiments, the present disclosure may be implemented in various modes other than the embodiments described above. The following gives such other embodiments included in the present disclosure.

[Application for Player Identification]

In the example given in Embodiment 1 above, a player with the coordinates within a predetermined distance from a point of change is extracted. In addition to this, a player other than such a player may also be extracted. For a goal-scoring scene, for example, the client terminal 10 may refer to the tracking information to extract a defender and/or a goal keeper located within a predetermined distance from the goal line or within the penalty area, and set a video output range which further contains the path(s) of the player(s) thus extracted.

Also, the setter 15e identifies a first player touching the ball when the ball changes its moving direction on the horizontal plane to the moving direction in which the ball moves when sent into the goal (the player therefore being a goalscorer), and sets a video output range which includes: the path of the first player for a predetermined time period which is before the first player touches the ball; and the path of a second player who is on the same team as the first player and, in the predetermined time period, moves in the same direction as a third player on the opposing team who is located within a predetermined distance from the second player and within a predetermined area in front of the goal. This enables the video output range to contain the path of a player who is used as a decoy and the path of a defender who is tricked by the decoy.

For example, the setter 15e goes back in time from each point of change and identifies, among the players on the attacking team, an attacking player who is not a player identified as a ball-holder but closest to the ball-holding player. Then, the setter 15e compares the path of the attacking player who is not the goalscorer touching the ball when the ball changes its moving direction on the horizontal plane to the moving direction in which the ball moves when sent into the goal, with the path of each player on the defending team. For example, at the tracking intervals, the setter 15e obtains a similarity from the inner product of the vector between two sets of coordinates of the attacking player and the vector between two sets of coordinates of each defending player. If there is a pair of vectors whose similarity is larger than or equal to a predetermined value, the setter 15e sets a video output range by including in the video output range the paths of the attacking player and the defensive player of such a pair.

Figure 14:
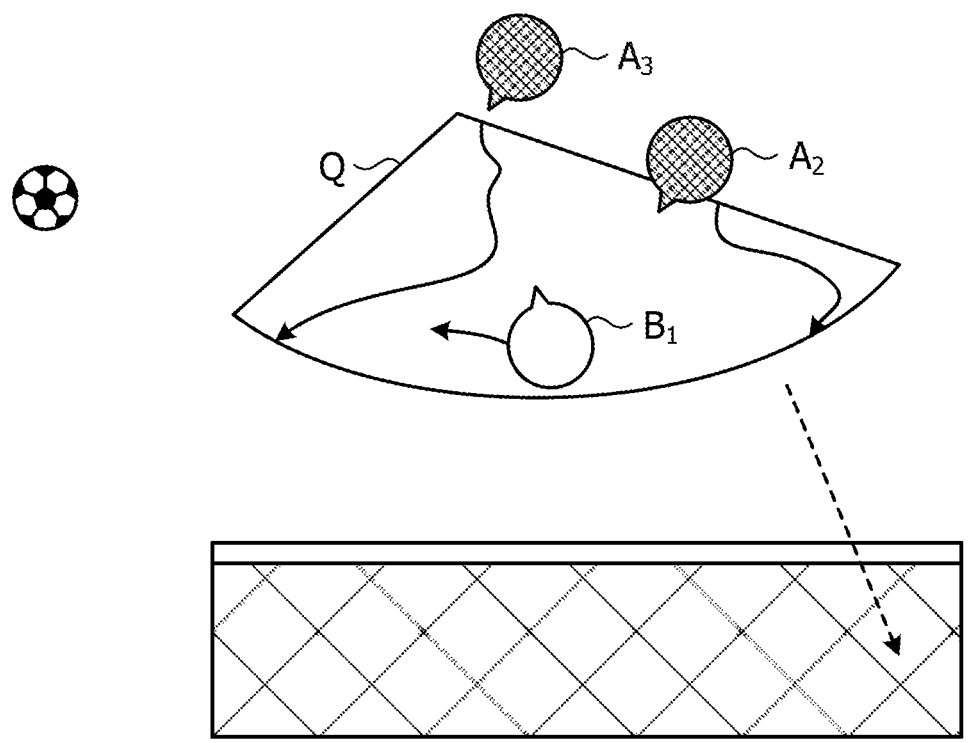
FIG. 14 is a diagram illustrating an example application for player identification.

FIG. 14 is a diagram illustrating an application example for player identification. FIG. 14 depicts the coordinates of the ball and the coordinates of each player in a goal-scoring scene. For example, FIG. 14 depicts, as an example of player coordinates, a time series of the coordinates of the player A2 who is the goal-getter on Team A, a time series of the coordinates of a player A3 on Team A used as a decoy for the player A2, and a time series of the coordinates of a player B1 which is a defender on Team B. In the examples depicted in FIGS. 5 to 8, the paths of the players located within a predetermined distance from the point of change, that is, a time series of the coordinates of the player A1 who centers the ball and a time series of the coordinates of the player A2 who sends the ball into the goal are identified. Meanwhile, in this goal-scoring scene, the movement of the player A3 acting as a decoy for the player A2 may be one of the features, as well. Thus, a description is given of the case where the client terminal 10 is designed to additionally perform processing operation for including in the video output range a time series of the player A3 who acts as a decoy.

It is likely that there is a defender that defends the player A3 acting as a decoy for the goal-getter, like in the example of FIG. 14. Thus, the above-described processing operation is performed to implement identification of the path of the player A3 as information processing. Specifically, in this processing, the client terminal 10 goes back in time from each point of change of a ball and identifies, among the players on the attacking team, an attacking player who is not a player identified as a ball-holder but closest to the ball-holder. Here, the player A2 is a goal-getter and at the same time a ball-holder detected at the ball coordinates Pt3, which is a point of change. Thus, going back in time from the time t3 when the ball is shot, the client terminal 10 identifies the attacking player A3 closest to the player A2 holding the ball. Then, the client terminal 10 goes on to perform processing to compare the path of the attacking player thus identified among the players on the attacking team except for the goal-getter player A2 and the path of each player on the defending team. For example, for each tracked time point, the client terminal 10 obtains a similarity between the inner product of the vector between two sets of coordinates of the attacking player and the vector between two sets of coordinates of each player on the defending team, and if there is a pair of vectors whose similarity is larger than or equal to a predetermined value, sets a video output range by also including in the video output range the paths of the attacking player and the defensive player of such a pair. As a result, in the example depicted in FIG. 14, the pair of the player A3 and the player B1 is extracted because there is a similarity between the vector of the player A3 and the vector of the Team B's player B1 decoyed by the player A3. Thus, the client terminal 10 may set a video output range by further including in the video output range an area Q containing the path of the player A3 and the path of the player B1.

[Automatic Viewpoint Selection]

For example, the setter 15e may place the viewpoint at a position on an imaginary line extended in the opposite direction from the direction on the horizontal plane in which the ball moves when sent into the goal, set the direction of the viewpoint to the moving direction of the ball, and with the viewpoint being fixed at the position on the imaginary line, change the direction of the viewpoint to follow the path the ball takes before changing its direction to the moving direction on the horizontal plane in which the ball moves when sent into the goal.

Figure 15:
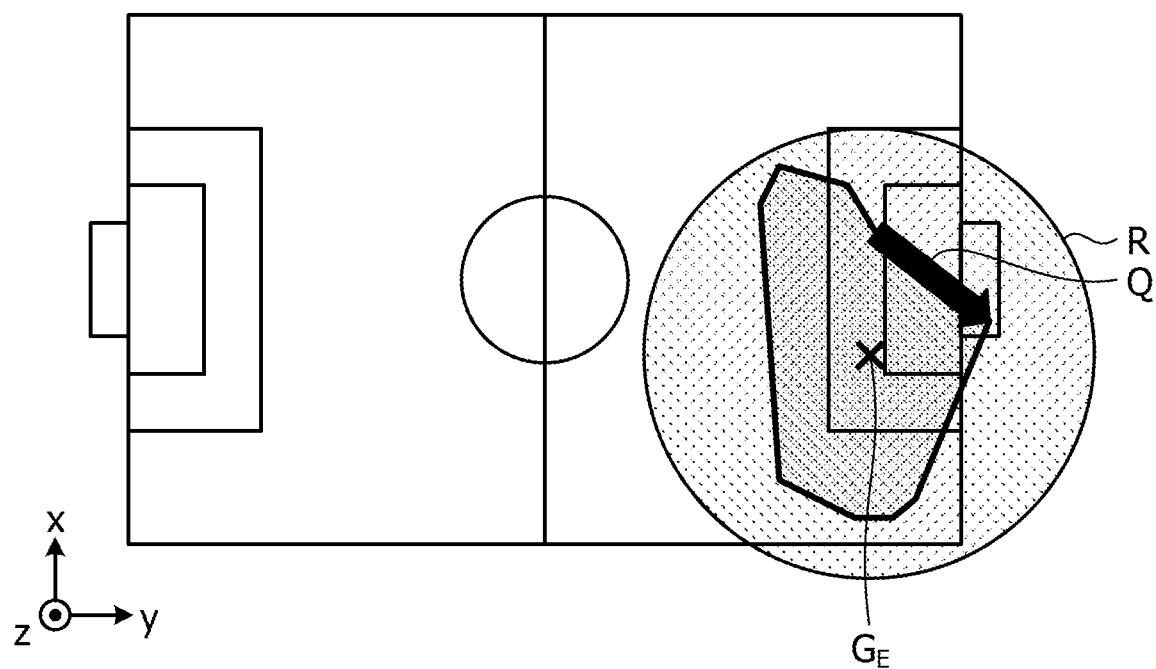
FIG. 15 is a diagram illustrating an example application for viewpoint selection.
Figure 16:
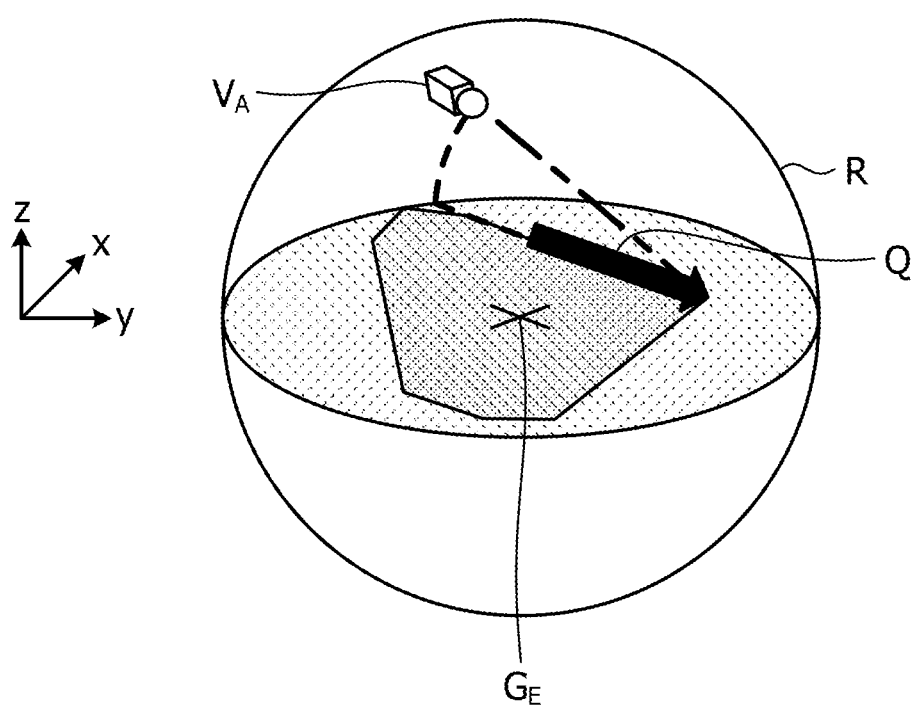
FIG. 16 is a diagram illustrating an example application for viewpoint selection.

FIGS. 15 and 16 are diagrams illustrating an example application for viewpoint selection. For example, when the viewpoint is preset to an initial position on the spherical plane R, the setter 15e identifies a path Q the ball takes when being sent into the goal, as illustrated in FIG. 15. The setter 15e then places the viewpoint at a position VA on an imaginary line extended in the opposite direction from the moving direction of the ball on the path Q that the ball takes when being sent into the goal, as illustrated in FIG. 16. This uniquely determines the longitude of the viewpoint VA but allows the latitude of the viewpoint VA to be freely determined. FIG. 16 illustrates, as an example, a case where an angle of 45° is formed by the horizontal plane of the field F and a line connecting the position of the viewpoint VA and the coordinates of the ball in the goal. With the position of the viewpoint VA being thus selected, the direction of the viewpoint is allowed to follow the ball coordinates from the start time to the end time of the scene. In other words, a virtual camera at the viewpoint position VA may be panned toward the ball coordinates at each time point in the scene. In addition, if the 3D coordinates of the ball are obtainable, the virtual camera may be tilted according to the height of the ball.

[Distribution and Integration]

The physical configurations of the components of each apparatus illustrated do not have to be as illustrated in the drawings. Specifically, the components of each apparatus are not limited to being distributed or integrated as illustrated, and all or some of them may be distributed among units or integrated into a unit functionally or physically depending on various kinds of loads and uses. For example, the acquirer 15a, the specification receiver 15b, the first identifier 15c, the second identifier 15d, the setter 15e, or the video generator 15f may be an external device to which the client terminal 10 is connected via a network. For example, the server apparatus 30 may include the acquirer 15a, the specification receiver 15b, the first identifier 15c, the second identifier 15d, the setter 15e, and the video generator 15f, with the client terminal 10 including only the display function. Alternatively, different apparatuses may include the acquirer 15a, the specification receiver 15b, the first identifier 15c, the second identifier 15d, the setter 15e, and the video generator 15f and implement the functions of the client terminal 10 by being connected via a network and cooperate with one another.

[Viewpoint Selection Assistance Program]

Each processing described in the above embodiments may be implemented when a computer such as a personal computer or a work station executes a prepared program. The following describes, using FIG. 17, an example of a computer that executes a viewpoint selection assistance program having the same functions as the above embodiments.

Figure 17:
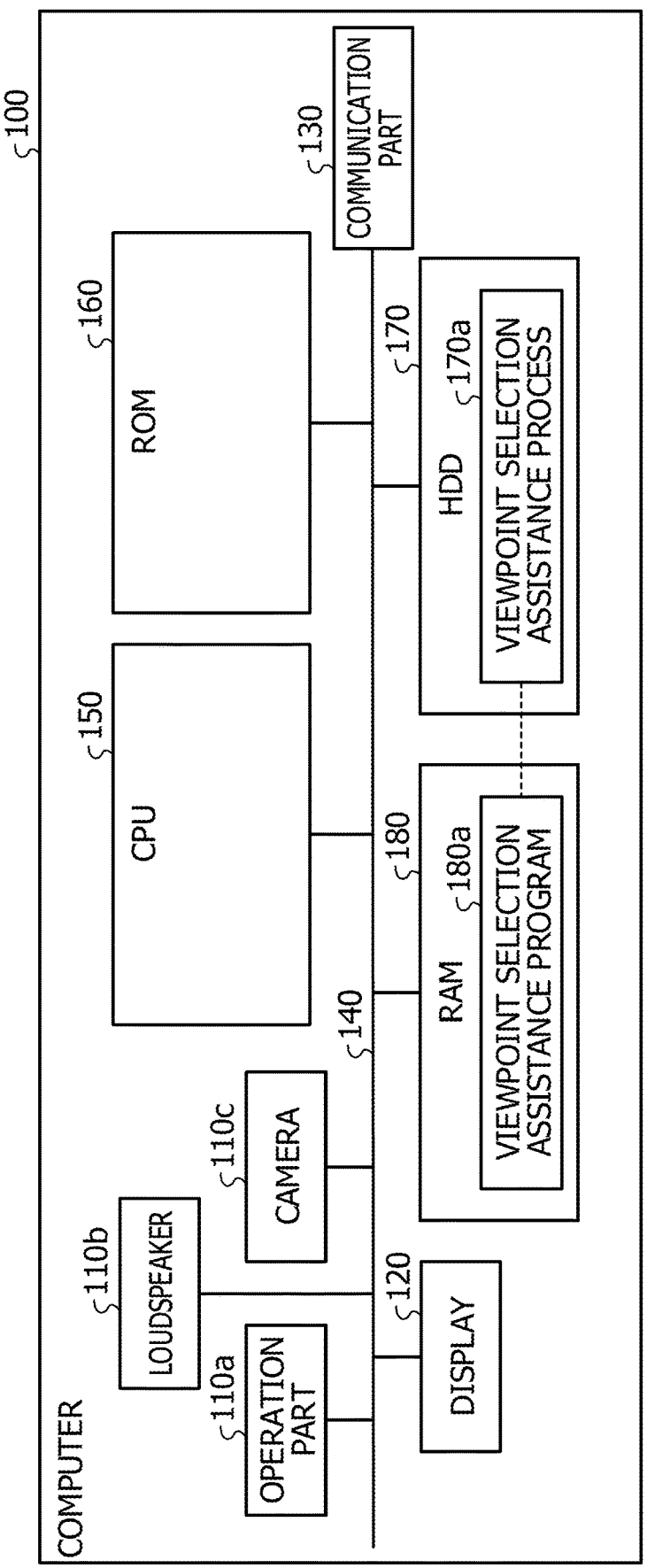
FIG. 17 is a diagram illustrating an example hardware configuration of a computer that executes a viewpoint selection assistance program according to Embodiments 1 and 2.

FIG. 17 is a diagram illustrating an example hardware configuration of a computer that executes the viewpoint selection assistance programs according to Embodiments 1 and 2. As illustrated in FIG. 17, a computer 100 has an operation part 110a, a loudspeaker 110b, a camera 110c, a display 120, and a communication part 130. The computer 100 further has a CPU 150, a ROM 160, an HDD 170, and a RAM 180. These elements 110 to 180 are connected to one another via a bus 140.

As illustrated in FIG. 17, the HDD 170 stores therein a viewpoint selection assistance program 170a that implements the same functions as the acquirer 15a, the specification receiver 15b, the first identifier 15c, the second identifier 15d, the setter 15e, and the video generator 15f described in Embodiment 1. Portions or a portion of the viewpoint selection assistance program 170a may be integrated or separated, as the acquirer 15a, the specification receiver 15b, the first identifier 15c, the second identifier 15d, the setter 15e, and the video generator 15f illustrated in FIG. 2 may be. In other words, the HDD 170 do not have to store all the data illustrated in Embodiment 1 above, but only data used for the processing.

Under such an environment, the CPU 150 reads the viewpoint selection assistance program 170a from the HDD 170 and loads it into the RAM 180. As a result, the viewpoint selection assistance program 170a functions as a viewpoint selection assistance process 180a as illustrated in FIG. 17. The viewpoint selection assistance process 180a reads various pieces of data from the HDD 170, loads them into a memory area in the RAM 180 allocated to the viewpoint selection assistance process 180a, executes various kinds of processing using the various pieces of data thus loaded. An example of processing executed by the viewpoint selection assistance process 180a includes the processing illustrated in FIG. 13. Note that not all the processors illustrated in Embodiment 1 have to be operated on the CPU 150, as long as a processor that corresponds to the processing to be executed is virtually implemented.

Note that the viewpoint selection assistance program 170a does not have to be stored in the HDD 170 and the ROM 160 from the beginning. For example, the viewpoint selection assistance program 170a may be stored in a "portable physical medium" insertable to the computer 100, such as a flexible disk (FD), a CD-ROM, a DVD, a magneto-optical disk, or an IC card. Then, the computer 100 may acquire the viewpoint selection assistance program 170a from the portable physical medium and execute it. Alternatively, the viewpoint selection assistance program 170a may be stored in a different computer or a server apparatus connected to the computer 100 via a public telephone circuit, the Internet, a LAN, a WAN, or the like, and the computer 100 may acquire the viewpoint selection assistance program 170a from the different computer or the server apparatus and execute it.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method, implemented by a computer, for viewpoint selection assistance in free viewpoint video generation, the method comprising:

executing, by a processor of the computer, acquisition processing that includes acquiring three-dimensional information with respect to a subject on a field by using a plurality of cameras placed around the field;

executing, by the processor of the computer, first identification processing that includes identifying a path of a ball for a predetermined period based on the three-dimensional information;

executing, by the processor of the computer, second identification processing that includes identifying at least one player located within a predetermined distance from a position of the ball for a predetermined duration of time or longer in the predetermined period;

executing, by the processor of the computer, setting processing that includes setting, as a video output range, a range containing both of the path of the ball and a path of the at least one player; and executing, by the processor of the computer, generation processing that includes generating video for the range set by the setting processing.

2. The method according to claim 1, wherein the setting processing includes setting a spherical surface which contains the range thus set and has a center of mass of the range as a center of the spherical surface, and outputting a screen for receiving positioning of a viewpoint on the spherical surface.

3. The method according to claim 1, wherein the setting processing includes placing a viewpoint at a position on an imaginary line extended in an opposite direction from a moving direction on a horizontal plane in which the ball moves when sent into a goal, setting a direction of the viewpoint to the moving direction of the ball, and with the viewpoint being fixed at the position on the imaginary line, changing the direction of the viewpoint to follow a path that the ball takes before changing a direction thereof to the moving direction on the horizontal plane in which the ball moves when sent into the goal.

4. The method according to claim 1, wherein the setting processing includes identifying a first player touching the ball when a moving direction of the ball on a horizontal plane changes to a moving direction in which the ball moves when sent into a goal, and setting as the video output range a range containing a path of the first player for a predetermined period of time which is before the first player touches the ball and a path of a second player who is on the same team as the first player and, in the predetermined period of time, is located within a predetermined distance from the first player and moves in the same direction as a direction in which a third player moves, the third player being on a team different from the first or second player and being located within a predetermined range in front of a goal.

5. An apparatus for viewpoint selection assistance in free viewpoint video generation, the apparatus comprising:

a memory;

a processor coupled to the memory and configured to execute acquisition processing that includes acquiring three-dimensional information with respect to a subject on a field by using a plurality of cameras placed around the field;

execute first identification processing that includes identifying a path of a ball for a predetermined period based on the three-dimensional information;

execute second identification processing that includes identifying at least one player located within a predetermined distance from a position of the ball for a predetermined duration of time or longer in the predetermined period;

execute setting processing that includes setting, as a video output range, a range containing both of the path of the ball and a path of the at least one player; and execute generation processing that includes generating video for the range thus set.

6. A non-transitory computer-readable storage medium for storing a program regarding viewpoint selection assistance in free viewpoint video generation, the program causing a processor to execute a process, the process comprising:

executing acquisition processing that includes acquiring three-dimensional information with respect to a subject on a field by using a plurality of cameras placed around the field;

executing first identification processing that includes identifying a path of a ball for a predetermined period based on the three-dimensional information;

executing second identification processing that includes identifying at least one player located within a predetermined distance from a position of the ball for a predetermined duration of time or longer in the predetermined period;

executing setting processing that includes setting, as a video output range, a range containing both of the path of the ball and a path of the at least one player; and executing generation processing that includes generating video for the range thus set.

* * * * *